Figure 1:
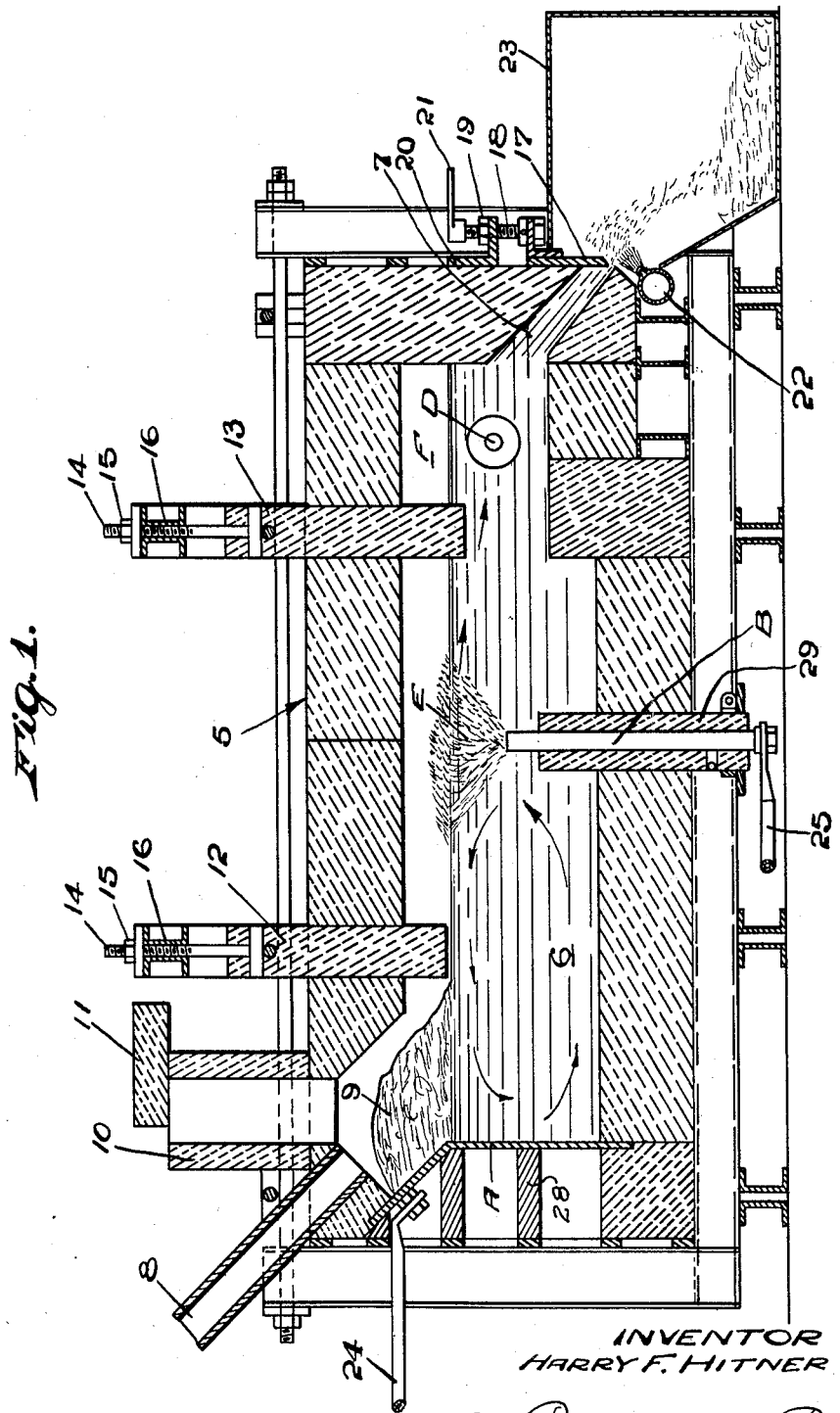

July 5, 1938.  H. F. HITNER  2,122,469
APPARATUS FOR MAKING GLASS
Filed Sept. 10, 1936  3 Sheets-Sheet 1

INVENTOR
HARRY F. HITNER
BY Bradley & Bee
ATTORNEYS.

July 5, 1938.  H. F. HITNER  2,122,469
APPARATUS FOR MAKING GLASS
Filed Sept. 10, 1936  3 Sheets-Sheet 2

INVENTOR
HARRY F. HITNER
BY Bradley & Bee
ATTORNEYS.

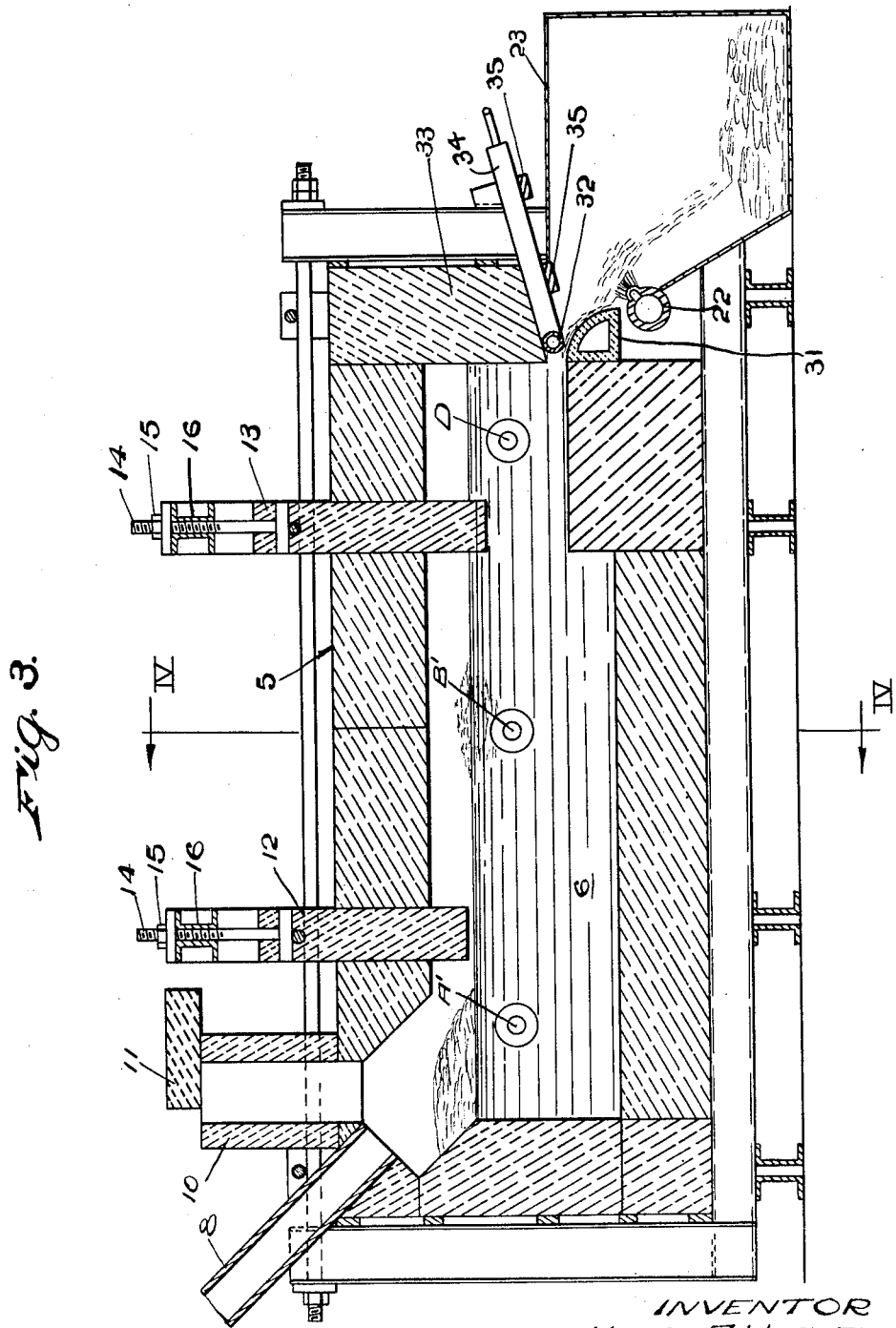

Patented July 5, 1938

2,122,469

UNITED STATES PATENT OFFICE 2,122,469

APPARATUS FOR MAKING GLASS

Harry F. Hitner, Oakmont, Pa., assignor to Pittsburgh Plate Glass Company, a corporation of Pennsylvania Application September 10, 1936, Serial No. 100,135

4 Claims. (Cl. 13—6)

The invention relates to an apparatus for melting glass by the use of electricity as a melting and fining agent. The apparatus is well adapted to the manufacture of glass wool, and the tanks, as here illustrated, are shown with means at their outlet ends for converting the highly fluid glass into wool, but it will be understood that the invention is not limited to use in this connection and may be employed for the melting of glass to be made into sheets, containers, and the like, and for the manufacture of other vitreous products broadly comprehended by the term "glass", such as the frit used in enamelling, and sillicate of soda (water glass). In the manufacture of glass wool, it is desirable that special means be provided for bringing the glass adjacent the point of conversion into fibrous particles to a very high degree of fluidity and the tanks illustrated are provided with such means, but it will be understood that this portion of the apparatus is subject to modification when the glass is to be converted into sheets or containers as under such conditions it may be desirable to reduce the temperature of the glass at the point of outlet rather than to increase it.

Figure 2:
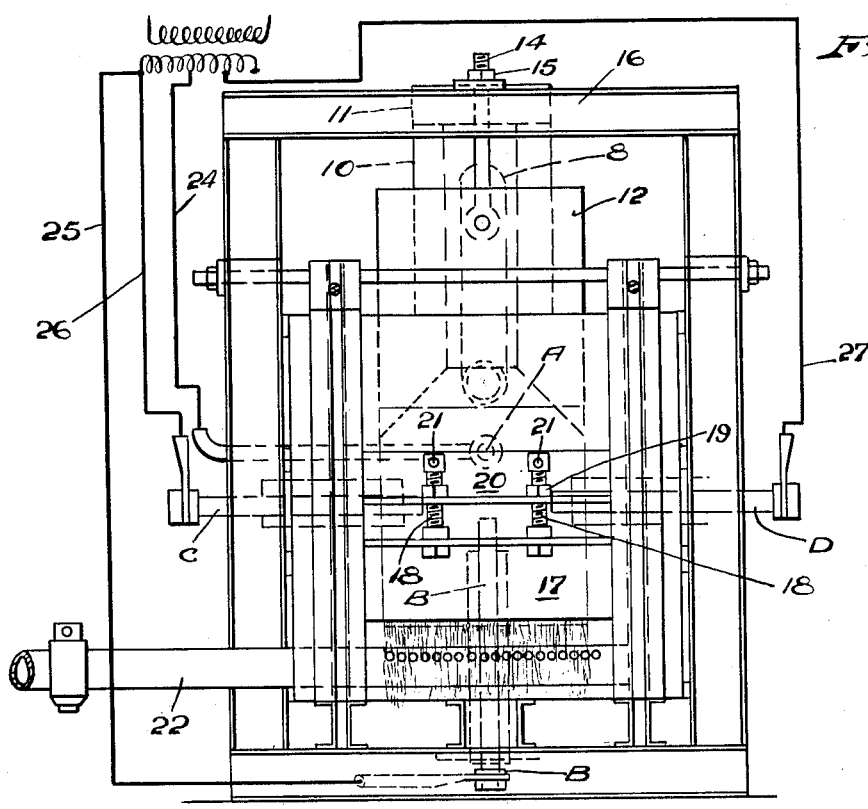
Figure 4:
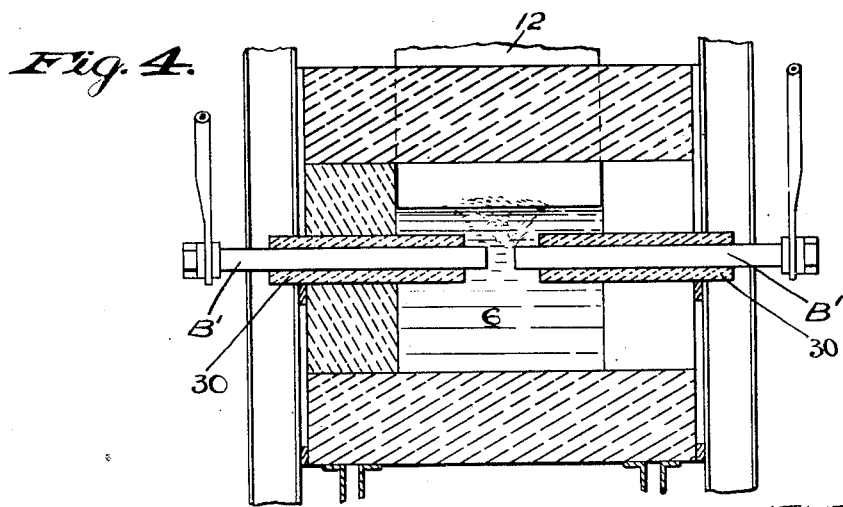

In an electrical glass melting operation, it is fundamental that the fusing of the batch and the fining of the fused glass shall be carried out at a rapid rate, as this permits the tanks of a given capacity to be made smaller and reduces the operating and upkeep cost, as is well known to those skilled in the art. One of the principal objects of the present invention is to speed up the operation, particularly the fining step in which the molten glass is freed from the gases incident to the reaction of the elements of the batch; and to accomplish this result without causing a too rapid deterioration of the clay work of the tank in the section in which the fining step occurs. A further object of the invention is to provide an arrangement and procedure which will result in the dissipation of the vitreous foam which ordinarily collects on the surface of the glass incident to the vigorous boiling action in fining, and which tends to fill up the space between the surface of the bath and the arch of the tank, reducing the efficiency of the tank and in some cases causing a suspension of the procedure. Certain embodiments of the apparatus employed in carrying out the process are shown in the accompanying drawings, wherein:

Figure 1 is a longitudinal section through the tank at its center. Fig. 2 is a front elevation of a tank. Fig. 3 is a section similar to Fig. 1 through a modification. And Fig. 4 is a section on the line IV—IV of Fig. 3.

Referring to the construction of Figs. 1 and 2, 5 is a melting tank of refractory material containing a body of molten glass 6. This tank is provided at its forward end adjacent the bottom with an outlet opening 7 for the discharge of the molten glass. At the rear end of the furnace is a supply pipe 8, to which batch is fed comprising the ingredients necessary to form the glass, such batch being fed into the tank intermittently or continuously depending upon requirements, and in practice, such batch collects in a body, as indicated at 9, floating upon the surface of the bath and being melted as the operation progresses. A chimney 10 adjacent the rear end of the furnace provides for the escape of gases which are formed over the body of glass due to the reduction of the batch, the outlet from this chimney being suitably regulated by a suitable damper, which in the present instance is merely a refractory clay slab 11. In order to regulate the temperature of the glass in the bath, a pair of vertically movable gates 12 and 13 working through slots in the top wall of the furnace are provided, such gates being raised and lowered by means of screws 14, 14 anchored at their lower ends in the gates 12 and 13 and provided with the nuts 15, 15 resting upon the pairs of channels 16, 16, which constitute part of the superstructure above the tank.

An additional gate 17 of refractory material, such as nickel chromium, clay or the like, is provided at the front end of the furnace for regulating the flow of glass through the outlet 7. This gate is moved up and down by a screw 18 working through a nut 19 carried by the angle 20 and operated by the handle 21. Means are provided adjacent the lower end of the outlet for converting the glass into glass wool. Such means preferably comprise a pipe 22 perforated on its forward side and supplied with superheated steam. As the glass descends in a thin stream in front of the pipe 22, the jets of steam passing thereacross at high velocity flow the glass forward in small threads, which are immediately solidified and carried forward into the box 23, which acts as a collector for the material. This general arrangement for converting molten glass into glass wool is well known in the art, so that no detailed description is required, such means constituting no part of the present invention, which invention relates particularly to means for melting and conditioning glass in the tank as hereafter described.

Current is supplied through the body of glass in the tank from four electrodes A, B, C and D which are connected to the source of current supply by means of the leads 24, 25, 26 and 27, as shown in Fig. 2, suitable means being provided for regulating the amount of current flowing through each lead (automatically if desired) so as to give the proper temperature in various parts of the tank. The system shows the use of single phase current, but it will be understood that three phase current may be used, depending upon conditions and requirements, as illustrated in my Patent No. 1,610,377, dated December 14, 1926.

The electrode A at the rear end of the tank is in the form of a refractory plate of chromium iron alloy or other suitable metal, such as that described and shown in my Patent No. 1,815,977, dated July 28, 1931, such plate being suitably supported by the backing members 28 as also shown and more fully described in my Patent No. 1,815,977. The flow of current through the body of glass in the tank between the electrodes A, B, C and D maintains the glass at the proper temperature and serves to convert the batch from the mass 9 into a molten condition as the operation progresses.

The electrode B is of graphite and extends upward through the bottom of the tank, being shielded except at its extreme upper end by means of the sleeve 29 of refractory material. The unshielded end of this electrode is relatively close to the surface of the glass, and is located midway between the side walls of the furnace, as indicated in Fig. 2. This electrode is relatively small as compared with the electrode A so that when the flow of current occurs through the bath between the electrodes A and B, a high concentration of current is secured in the bath in the zone immediately surrounding the end of the electrode B. As a result of this current density, a very high temperature is produced in the glass above and surrounding the end of the electrode B. This gives a violent boiling action in the glass at this point, so that a very rapid fining is secured. Since the boiling point is relatively close to the surface of the glass, the bubbles can escape much more readily to the space above the bath than would be the case if the active portion of the electrode contacting with the glass were located adjacent the bottom of the bath where the glass is more viscous and the pressure head greater. It follows that the fining action progresses at a rapid rate with a very free escape of the bubbles incident to the reaction to the atmosphere above the bath, and the gases which thus accumulate are discharged to the rear and upward through the outlet 10. Glass at boiling temperature is, of course, very active in its reaction upon the clay work of a tank, and it is, therefore, advantageous to have the active end of the electrode B located in the bath as far as possible from clay surfaces, such as the side and bottom walls of the tank which would otherwise be subject to rapid erosion.

During the operation of the furnace, convection currents are set up in the glass so that there is a current to the rear of the electrode B, as indicated by the arrows in Fig. 1, such current first flowing to the rear, then downwardly and finally forwardly through the lower portion of the bath. This current promotes the more rapid melting of the batch, as the upper portion of the current strikes the lower body of the batch submerged in the glass and reduces it in temperature, and finally carries it forwardly to the electrode B, where it is carried upward into the active zone of boiling indicated by the reference letter E.

There is also a forward current from the active zone E, as indicated by the arrows, which carries the fined glass past the electrodes C and D to the outlet 7. This forward movement is under the control of the gate 13, which acts as a skimmer and prevents the foam which results from the boiling action in the zone E from being carried to the outlet 7 and thus impairing the quality of the glass. In this connection, it is pointed out that the foam or scum resulting from the boiling action is of relatively light character and much less in quantity than that which is ordinarily produced in the operation of electric furnaces in which the boil is produced at a point well down below the surface of the glass and in which the vitreous particles making up the foam are relatively heavier and more resistant to remelting in the bath.

The electrodes C and D are placed in opposition, as indicated in Fig. 2, and are preferably of graphite. Their function is to bring the fined glass to a relatively high temperature and to a condition most advantageous for forming glass wool. In those cases in which the glass is to be formed into sheets or containers, the requirement for reheating may not be present, although it is ordinarily desirable to bring the glass to uniform temperature preliminary to its discharge by the use of some supplemental heating means in the section F of the tank. It will be understood that the flow of current between the electrodes A and B and between the electrodes C and D is controlled so as to give conditions in the various portions of the tank which are most satisfactory for the operation. Such regulation may either be manual or automatic as determined by the temperature of the glass in the sections E and F and by the rapidity of reduction required in the section of the tank just forward of the electrode A.

Figs. 3 and 4 illustrate a modification, in which a pair of horizontal graphite electrodes B', B' are substituted for the single vertical electrode B. These electrodes are positioned so as to give an active zone for boiling which has substantially the same location as is the case when a single electrode is used. These electrodes are preferably shielded by clay sleeves 30, as indicated in Fig. 4, so that they may project well out into the tank without giving too great an exposure to contact with the glass, this being required in order to secure the necessary current density for producing the boiling action. Further in this construction, a pair of graphite electrodes A', A' placed in opposition to each other in the side walls of the tank, similar to the location of the electrodes B', B', are substituted for the plate electrode A. Since in this case, no large concentration of current is desired at any particular point, it is not necessary to extend the electrodes so that their ends approach each other as is the case with the electrodes B', B'. This arrangement of electrodes in the construction of Figs. 3 and 4 is not regarded as satisfactory as that shown in Figs. 1 and 2, but may be used with good results. The construction of Figs. 3 and 4 also varies from that of Figs. 1 and 2 in the character of the outlet for the glass at the forward end of the tank. As here shown, the glass flows over a hollow water cooled member 31 of refractory material, such as iron chromium alloy, past the perforated steam pipe 22 and the glass wool is formed, as heretofore described in connection with Fig. 1 by the passage of the steam jets through the thin curtain of descending glass. The thickness of this stream is regulated in this case by a transverse pipe 32 of heat resisting metal which is water cooled and which is slidable along the inclined bottom of the clay end block 33, the outwardly extending ends 34 of the pipe being guided and supported by the transverse bars 35. The thickness of the stream is thus regulated by moving the pipe in and out. The advantage incident to this form of flow control as compared with that of Fig. 1 is that the stream of glass is cooled to a less extent, despite the fact that the members 31 and 32 are of metal and are water cooled. The functioning of this form of apparatus of Figs. 3 and 4 is the same as that described in connection with the construction of Figs. 1 and 2.

What I claim is:

1. Apparatus for melting glass comprising a tank of substantial length and breadth, wherein molten glass acts as a resistance to a current of electricity, means for supplying batch to one end of the tank, an electrode in said tank in contact with the glass therein, a second electrode in the tank remote from the first electrode entirely beneath the normal glass level but adjacent such level and remote from the side and end walls of the tank, means for causing a flow of electricity between the electrodes with a maximum current density in the glass adjacent the point of contact between the glass and said second electrode so that a boil is produced at such point, and an outlet for withdrawing glass from the end of the tank which is remote from the end to which the batch is supplied and remote from said second electrode.

2. Apparatus for melting glass comprising a tank of substantial length and breadth wherein molten glass acts as a resistance to a current of electricity, means for supplying batch to one end of the tank, an electrode in said tank adapted to contact with the glass therein, a second vertical electrode projecting up through the bottom of the tank remote from the first electrode having its upper end beneath the normal glass level but adjacent such level and remote from the side and end walls of the tank, means for causing a flow of electricity between the electrodes with a maximum current density in the glass adjacent the point of contact between the glass and said second electrode so that a boil is produced at such point, and an outlet for withdrawing glass from the end of the tank which is remote from the end to which the batch is supplied and remote from second electrode.

3. Apparatus for melting glass comprising a tank of substantial length and breadth, wherein molten glass acts as a resistance to a current of electricity, means for supplying batch to one end of the tank, an electrode in said tank in contact with the glass therein, a second vertical electrode remote from the first electrode projecting upward through the bottom of the tank with its upper end beneath the level of the glass and its lower portion shielded from the glass, such upper end being remote from the side and end walls of the tank, means for causing a flow of electricity through the glass between the electrodes with a maximum current density in the glass around the end of said second electrode so that a boil is produced in such area, and an outlet for withdrawing glass from the end of the tank which is remote from the end to which batch is supplied.

4. Apparatus for melting glass comprising a tank of substantial length and breadth, wherein molten glass acts as a resistance to a current of electricity, means for supplying batch to one end of the tank, an electrode in said tank in contact with the glass therein, a second vertical electrode remote from the first electrode projecting upward through the bottom of the tank with its upper end beneath the level of the glass and its lower portion shielded from the glass, such upper end being remote from the side and end walls of the tank, means for causing a flow of electricity through the glass between the electrodes with a maximum current density in the glass around the end of said second electrode so that a boil is produced in such area, and an outlet for withdrawing glass from the end of the tank which is remote from the end to which batch is supplied, said second electrode having an area in contact with the glass which is relatively small as compared with the area of the other electrode which contacts with the glass.

HARRY F. HITNER.